US009756190B2

United States Patent
Smith

(10) Patent No.: US 9,756,190 B2
(45) Date of Patent: Sep. 5, 2017

(54) SYSTEMS AND METHODS FOR SETTING UP INTERNET PROTOCOL COMMUNICATIONS

(71) Applicant: VONAGE BUSINESS INC., Atlanta, GA (US)

(72) Inventor: Robert Smith, Atlanta, GA (US)

(73) Assignee: VONAGE BUSINESS INC., Atlanta, GA (US)

( * ) Notice: Subject to any disclaimer, the term of this patent is extended or adjusted under 35 U.S.C. 154(b) by 29 days.

(21) Appl. No.: 14/575,770

(22) Filed: Dec. 18, 2014

(65) Prior Publication Data

US 2016/0182732 A1     Jun. 23, 2016

(51) Int. Cl.
| | | |
|---|---|---|
| *H04L 12/28* | (2006.01) | |
| *H04M 7/12* | (2006.01) | |
| *H04L 29/06* | (2006.01) | |
| *H04L 12/741* | (2013.01) | |

(52) U.S. Cl.
CPC ........ *H04M 7/1285* (2013.01); *H04L 65/105* (2013.01); *H04L 65/1069* (2013.01); *H04M 7/128* (2013.01); *H04L 45/745* (2013.01)

(58) Field of Classification Search
None
See application file for complete search history.

(56) References Cited

U.S. PATENT DOCUMENTS

| | | | | |
|---|---|---|---|---|
| 6,625,141 B1 * | 9/2003 | Glitho | ................ | H04L 12/6418 370/352 |
| 7,508,754 B1 * | 3/2009 | Sankaranaraynan | ... | H04M 3/12 370/216 |
| 7,630,372 B1 * | 12/2009 | Androski | .......... | H04L 29/12594 370/349 |
| 7,738,452 B1 * | 6/2010 | O'Rourke | ............. | H04L 47/125 370/389 |
| 8,649,498 B1 * | 2/2014 | Rankin | ............. | H04M 3/42314 379/219 |
| 2003/0112932 A1 * | 6/2003 | Johnston | ............... | H04M 15/00 379/114.01 |
| 2005/0243805 A1 * | 11/2005 | Kaizawa | ............... | H04M 7/006 370/352 |
| 2007/0110038 A1 * | 5/2007 | Sakata | .................. | H04M 15/00 370/352 |
| 2008/0189435 A1 * | 8/2008 | Ali | ......................... | H04L 45/00 709/242 |
| 2009/0116627 A1 * | 5/2009 | Ropolyi | .................. | H04L 12/14 379/114.03 |

(Continued)

*Primary Examiner* — Kwang B Yao
*Assistant Examiner* — Juvena Loo
(74) *Attorney, Agent, or Firm* — Nixon & Vanderhye P.C.; Joseph Pagnotta

(57) ABSTRACT

A proxy server of an Internet protocol (IP) telephony system determines when a call setup message generated by a first of the IP telephony system's customers is directed to a second of the IP telephony system's customers. When that occurs, the call setup message is forwarded directly to a call cluster operated by the IP telephony system and that services the second customer. As a result, the call is handled internally by the IP telephony system, and there is no need to involve a second telephony system in conducting the requested call. The proxy server may also insert information into the call setup messaging to flag the call as an internal call between two customers of the IP telephony system.

28 Claims, 8 Drawing Sheets

(56) References Cited

U.S. PATENT DOCUMENTS

| | | | |
|---|---|---|---|
| 2009/0225749 A1* | 9/2009 | Izaki | H04L 12/66 |
| | | | 370/352 |
| 2011/0066707 A1* | 3/2011 | Brunson | H04L 29/12122 |
| | | | 709/221 |
| 2011/0263263 A1* | 10/2011 | Lau | H04M 15/00 |
| | | | 455/445 |
| 2013/0196696 A1* | 8/2013 | Brittain | H04M 3/42102 |
| | | | 455/466 |
| 2014/0032773 A1* | 1/2014 | Peter | H04L 67/142 |
| | | | 709/228 |
| 2014/0237127 A1* | 8/2014 | Vass | H04L 65/1016 |
| | | | 709/227 |
| 2014/0274086 A1* | 9/2014 | Boerjesson | H04L 65/1006 |
| | | | 455/450 |

* cited by examiner

SYSTEMS AND METHODS FOR SETTING UP INTERNET PROTOCOL COMMUNICATIONS

BACKGROUND OF THE INVENTION

The invention is related to Internet protocol (IP) telephony systems. More specifically, the invention is related to systems and methods for setting up new telephony communications for a customer of an IP telephony system.

An IP telephony system stores user and account information in various databases. The account information could be for a single user's account, for a family account that includes multiple users, or for a business account that also includes multiple users. As the IP telephony system adds additional users and accounts, the databases that store user and account information also grow. As more and more information is added to those databases, it eventually makes sense, or becomes necessary, to separate a single large database into two or more smaller databases. However, once this occurs, it can create problems with connecting calls between two users of the IP telephony system. The problems that can occur when a single database of user or account information is separated into two or more separate databases is described below in connection with FIGS. 1 and 2.

FIG. 1 depicts a communications environment which includes an IP telephony system 130 that operates to connect calls for its customers. The IP telephony system 130 includes a single call cluster 131 that is coupled to an inbound proxy server 132 and an outbound proxy server 134. The IP telephony system 130 also includes a billing unit 136 that receives call detail records (CDRs) from elements that are part of the IP telephony system 130, and from elements outside the IP telephony system 130. The billing unit 136 uses information in the CDRs to bill the users of the IP telephony system 130, and to bill other telephony systems for completing calls to users of the IP telephony system 130.

The IP telephony system 130 includes a call cluster 131 that acts to setup outgoing and incoming calls for customers. The call cluster 131 makes use of an inbound proxy server 132 to receive incoming calls from third party telephony systems, and an outbound proxy server 134 to setup outgoing calls that are to be handled by third party telephony systems. The call cluster 131, the inbound proxy server 132 and the outbound proxy server 134 are all coupled to a data network 150, such as the Internet. In some instances, elements of the call cluster 131 may be directly coupled to the inbound proxy server 132 and/or the outbound proxy server 134. In other instances, elements of the call cluster 131 may communicate with the inbound proxy server 132 and the outbound proxy server 134 only via data communications passing through a data network 150 such as the Internet.

The inbound proxy server 132 and the outbound proxy server 134 are also coupled to one or more third party telephony systems 140, such as a publically switched telephone network (PSTN), a cellular telephony system, or another Internet protocol telephony system. The inbound proxy server 132 and the outbound proxy server 134 may be directly connected to one or more third party telephony systems, or they may communicate with other telephony systems via a data network 150 such as the Internet.

The third party telephony systems 140 are connected to customer telephony devices, which can include an analog telephony device 160 that is coupled to a PSTN, a cellular telephone 162 that communicates through a cellular telephony system, and a smartphone that communicates through a cellular telephony system. The smartphone 164 may also be capable of establishing a wireless data connection to a data network 150, such as the Internet, via a wireless router. Such a wireless data connection could make it possible for the smartphone 164 to establish and conduct telephone calls through an Internet protocol telephony system via data communications passing over the Internet 150.

FIG. 1 also shows that users of the IP telephony system 130 130 exist under two different accounts. A first account 110 includes two IP telephony devices 112, 114. The two IP telephony devices 112, 114 are able to receive incoming calls or place outgoing calls through the call cluster 131. The two IP telephony devices 112, 114 communicate with the call cluster 131 via a data network 150 such as the Internet. The two IP telephony devices 112, 114 could be co-located in a building or within a business. However, because the IP telephony devices 112, 114 communicate via a data network connection, the IP telephony devices 112, 114 could be located anywhere so long as they can connect to the data network 150.

The second account 120 includes three IP telephony devices 122, 124, 126. Here again, the three IP telephony devices 122, 124, 126 communicate via a data network connection, and thus can be located anywhere that they can connect to the data network.

The first and second accounts 110, 120 could represent two different businesses that have established accounts with the IP telephony system 130. In other instances, one or both of the accounts could represent a family that has multiple telephony devices. Typically, however, the billing for an account would be consolidated and sent to a central location.

Although FIG. 1 only shows two accounts, in fact an IP telephony system 130 could service a large number of different accounts, and each account could have a large number of IP telephony devices. Thus, FIG. 1 is only intended to provide a high level depiction of the elements involved in such a communications environment.

The call cluster 131 includes databases with information about each of the accounts, and each of the IP telephony devices used by each account. Elements of the call cluster 131 directly communicate with the IP telephony devices used by customers to setup outgoing telephony communications and to setup incoming telephony communications directed to the customers' IP telephony devices.

When a customer wishes to setup a telephony communication that is directed to a telephony device that does not belong to one of one of the accounts serviced by the IP telephony system 130, the telephony communication is sent through a third party telephony system 140. For example, if a user of the first IP telephony device 112, which is part of the first account 110, requests the setup of a telephone call to the analog telephony device 160, the call setup request is first passed from the IP telephony device 112 to a controller, such as a session border controller, of the call cluster 131. The controller checks to see if the call setup request is directed to another IP telephony device that is part of an account serviced by the IP telephony system 130. In this case, because the analog telephony device 160 is not part of an account serviced by the IP telephony system 130, the controller determines that the call setup request must be sent to another telephony system in order to be routed to the correct telephony device.

The controller of the call cluster 131 forwards the call setup request to the outgoing proxy server 134 for connection to the analog telephony device 160. The outbound proxy server 134 passes the call setup request to an appropriate third party telephony system, such as a PSTN 140, and the PSTN 140 ultimately forwards the call to the analog telephony device 160. Because the IP telephony system must enlist the aid of a third party telephony system to complete the requested call, the IP telephony system 130 will likely have to pay that third party telephony system to setup and complete the requested call to the analog telephony device 160. For this reason, the IP telephony system 130 may charge the first account 110 for setting up and carrying the requested call. In some instances, however, the cost of the requested call may be covered by a monthly fee paid by the first account 110.

When a user's IP telephony device requests the setup of a telephony communication that is directed to a telephony device that is part of one of the accounts serviced by the IP telephony system 130, a significantly different call flow results. For example, if a user of the first IP telephony device 112, which is part of the first account 110, requests the setup of a telephone call to the first IP telephony device 122 of the second account 120, the call setup request is first passed from the IP telephony device 110 to the controller of the call cluster 131. The controller checks to see if the call setup request is directed to another IP telephony device that is part of an account serviced by the IP telephony system 130, and discovers that this is the case. The controller causes a server of the call cluster 131 to setup the call to the first IP telephony device 122 of the second account 120 as an IP call. In this case, the IP telephony system 130 is able to setup and carry the call without the assistance of a third party telephony system. As a result, the IP telephony system 130 does not need to pay a third party in order to setup and carry the requested call. For this reason, the IP telephony system 130 may not charge the first account 110 for setting up and carrying the call.

When a party with a telephony device that is not serviced by the IP telephony system 130 wishes to setup a telephony communication to an IP telephony device that is serviced by the IP telephony system, the communication is also routed though the call cluster 131. The communication is first received from one of the third party telephony systems 140 by the inbound proxy server 132. The inbound proxy server 132 forwards the communication to the call cluster 131. The call cluster 131 then acts to route the call to the IP telephony device that corresponds to the dialed telephone number. The communication is then handled by a server of the call cluster, which sets up the telephony communication to the appropriate IP telephony device.

As mentioned above, as the IP telephony system 130 grows and adds additional accounts with additional users, the databases within the call cluster 131 become larger. At some point in time, it becomes desirable or necessary to split a single large database into two smaller databases. When this occurs, the IP telephony system will create a new, second call cluster with its own databases, controllers and servers for routing and carrying calls. The first call cluster ends up servicing a first subset of all the accounts, and the second call cluster ends up servicing a second subset of all the accounts. The databases in the first call cluster only include information about the accounts and IP telephony devices in the first subset, and the databases in the second call cluster only include information about the accounts and IP telephony devices in the second subset.

When a second call cluster is added to an IP telephony system as described above, and other changes to the basic structure are not made, it can cause various problems in routing calls to the IP telephony devices of users of the IP telephony system, as described below.

FIG. 2 depicts a communications environment similar to the one in FIG. 1, except that a second call cluster 137 and an associated inbound proxy server 138 and outbound proxy server 139 have been added to the IP telephony system. Also, a third account 170 with IP telephony devices 172, 174 has been added. FIG. 2 depicts the communications environment after enough new users and/or accounts have been added by the IP telephony system 130 that it became necessary to split the user and account databases in the original call cluster 131 into two separate databases. When that split occurs, the databases that remain in the first call cluster 131 have information about only the first account 110 and the second account 120, and the IP telephony devices 112, 114, 122, 124, 126 in those accounts. The databases in the second call cluster 137 have information about only the third account 170 and the IP telephony devices 172, 174 in that third account 170. The IP telephony devices in the first and second accounts 110, 120 all communicate with the first call cluster 131 to place outgoing calls, and to receive incoming calls. The IP telephony devices in the new third account 170 communicate with the second call cluster 137 to place outgoing calls and to receive incoming calls.

When the IP telephony system 130 is configured as depicted in FIG. 2, outgoing calls placed by IP telephony devices serviced by the IP telephony system 130, and which are directed to telephony devices that are not serviced by the IP telephony system 130, are handled in substantially the same manner as similar calls are handled by the system as depicted in FIG. 1. However, as will be explained below, when a user of an IP telephony device serviced by the IP telephony system 130 sends a telephony communication to another telephony device that is serviced by the IP telephony system 130, the call could be handled quite differently than it would be by the system depicted in FIG. 1.

For example, if a user of the first IP telephony device 112 of the first account 110 places a call to the IP telephony device 172 that is part of the third account, the IP telephony device 112 will sent a call setup message to the first call cluster 131. The first call cluster 131 checks its databases to determine if the called telephony device is listed in the databases. In this case, because the called IP telephony device 172 is serviced by the second call cluster 137, information about the IP telephony device 172 will not be present in the databases within the first call cluster 131. For this reason, the first call cluster 131 sends the call setup message to the first outbound proxy server 134, and the first outbound proxy server 134 sends the call to a third party telephony system 140 for connection to the called telephony device. The third party telephony system 140 routes the call to the second inbound proxy server 138 associated with the second call cluster 137. The second inbound proxy server 138 forwards the call setup message to the second call cluster 137. A controller of the second call cluster 137 then locates information about how to reach the IP telephony device 172 in its databases, and a server of the second call cluster 137 sends the call to the IP telephony device 172.

When a call is handled as described above, it is necessary to involve a third party telephony system in routing the call to the called telephony device, even though the call is originating from and terminating to IP telephony devices serviced by the IP telephony system 130. This means the IP telephony system 130 will be forced to pay a third party to route the call to one of its own customers, which is highly undesirable. It would be far preferable if a call originating from and terminating to IP telephony devices serviced by the IP telephony system 130 could be routed by elements of the IP telephony system 130 alone, so that it is not necessary to involve third party telephony systems.

DETAILED DESCRIPTION OF PREFERRED EMBODIMENTS

Figure 1:
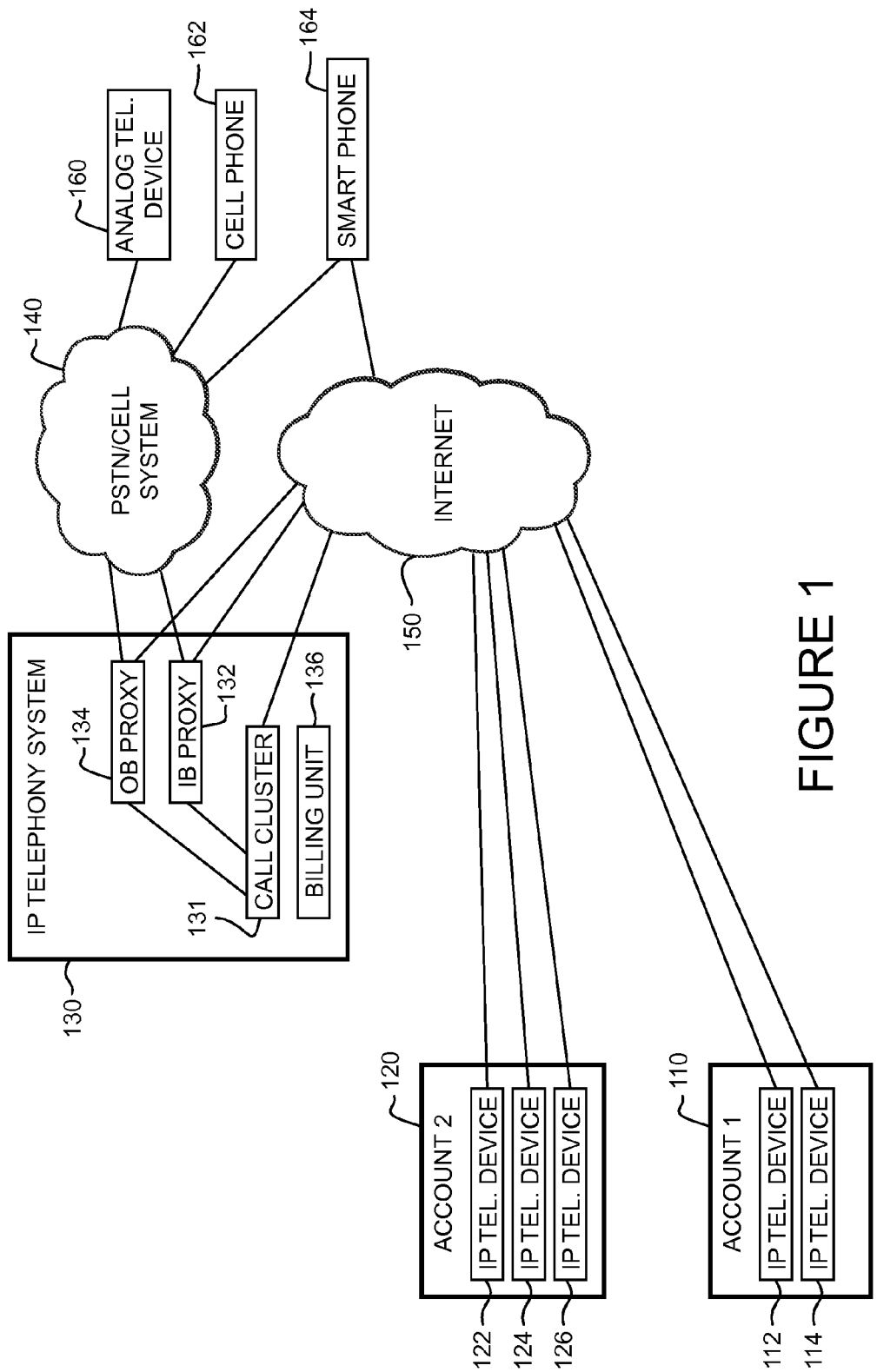
FIG. 1 is a diagram of a first communications environment that includes an Internet protocol (IP) telephony system having a single call cluster for routing telephony communications.
Figure 2:
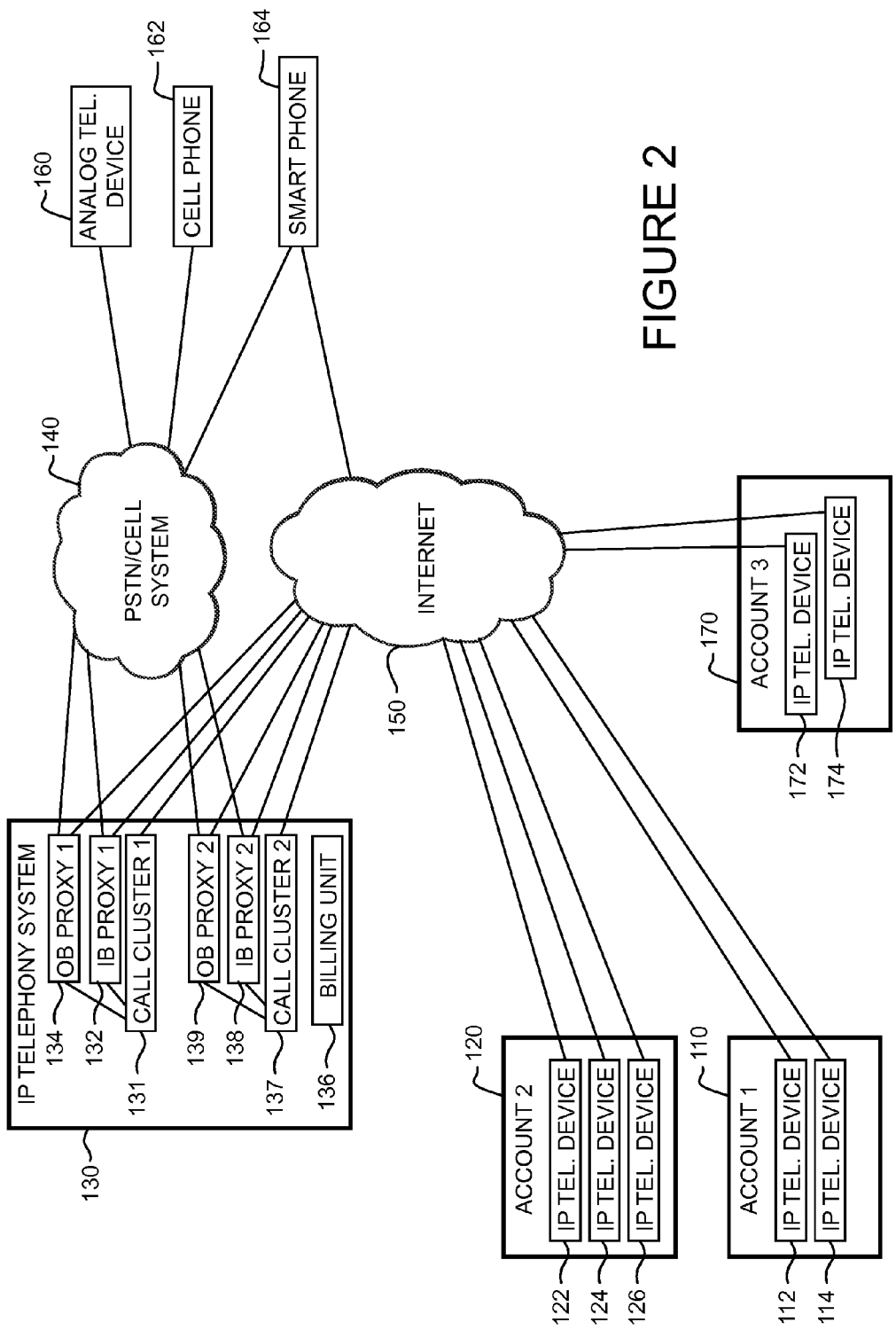
FIG. 2 is a diagram of a second communications environment that includes an Internet protocol (IP) telephony system having two call clusters for routing telephony communications.

The following detailed description of preferred embodiments refers to the accompanying drawings, which illustrate specific embodiments of the invention. Other embodiments having different structures and operations do not depart from the scope of the present invention.

In the following description, the terms VOIP system, VOIP telephony system, IP system and IP telephony system are all intended to refer to a system that connects callers and that delivers data, text or video communications using Internet protocol data communications.

References to an "IP telephony device" appear in both the foregoing and following descriptions. This term is used to refer to any type of device which is capable of interacting with an IP telephony system to conduct a communication. An IP telephony device could be an IP telephone, a computer running IP telephony software, a telephone adapter which is connected to an analog telephone, or some other type of device capable of communicating via data packets. An IP telephony device could also be a cellular telephone or a portable or tablet computing device that runs a software client that enables the device to act as an IP telephone. Thus, a single device might be capable of operating as both a cellular telephone and an IP telephony device.

Moreover, certain devices that are not traditionally used as telephony devices may act as telephony devices once they are configured with appropriate client software. Thus, some devices that would not normally be considered telephony devices may become telephony devices or IP telephony devices once they are running appropriate software. One example would be a desktop or a laptop computer that is running software that can interact with an IP telephony system over a data network to conduct telephone calls. Another example would be a portable computing device, such as an Apple iPod Touch™, which includes a speaker and a microphone. A software application loaded onto an Apple iPod Touch™ can be run so that the Apple iPod Touch™ can interact with an IP telephony system to conduct a telephone call.

The foregoing and following descriptions also refer to telephony communications and telephony activity. These terms are intended to encompass all types of telephony communications, regardless of whether all or a portion of the communications are carried in an analog or digital format. Telephony communications could include audio or video telephone calls, facsimile transmissions, text messages, SMS messages, MMS messages, video messages, and all other types of telephony and data communications sent by or received by a user. These terms are also intended to encompass data communications that are conveyed through a PSTN or VOIP telephony system. In other words, these terms are intended to encompass any communications whatsoever, in any format, which traverse all or a portion of a communications network or telephony network.

As mentioned above in the background section of the application, user and/or account information is stored in call clusters of an IP telephony system that are responsible for helping to setup new telephony communications for telephony devices serviced by the IP telephony system. When multiple call clusters are present in the IP telephony system, each call cluster services a subset of all the telephony devices serviced by the IP telephony system. The databases within a call cluster only include information about the telephony devices and accounts that are serviced by that call cluster. As also explained above, this can cause difficulties in routing telephony communications between two telephony devices that are both serviced by the IP telephony system, but which are serviced by different call clusters.

One way of overcoming the problems described above is to use a different type of proxy server to route telephony communications to and from the call clusters of an IP telephony system. For purposes of the following description, the new type of proxy server is called a carrier proxy server. A single carrier proxy server replaces both the inbound proxy server and the outbound proxy server that are usually associated with a call cluster.

Figure 3:
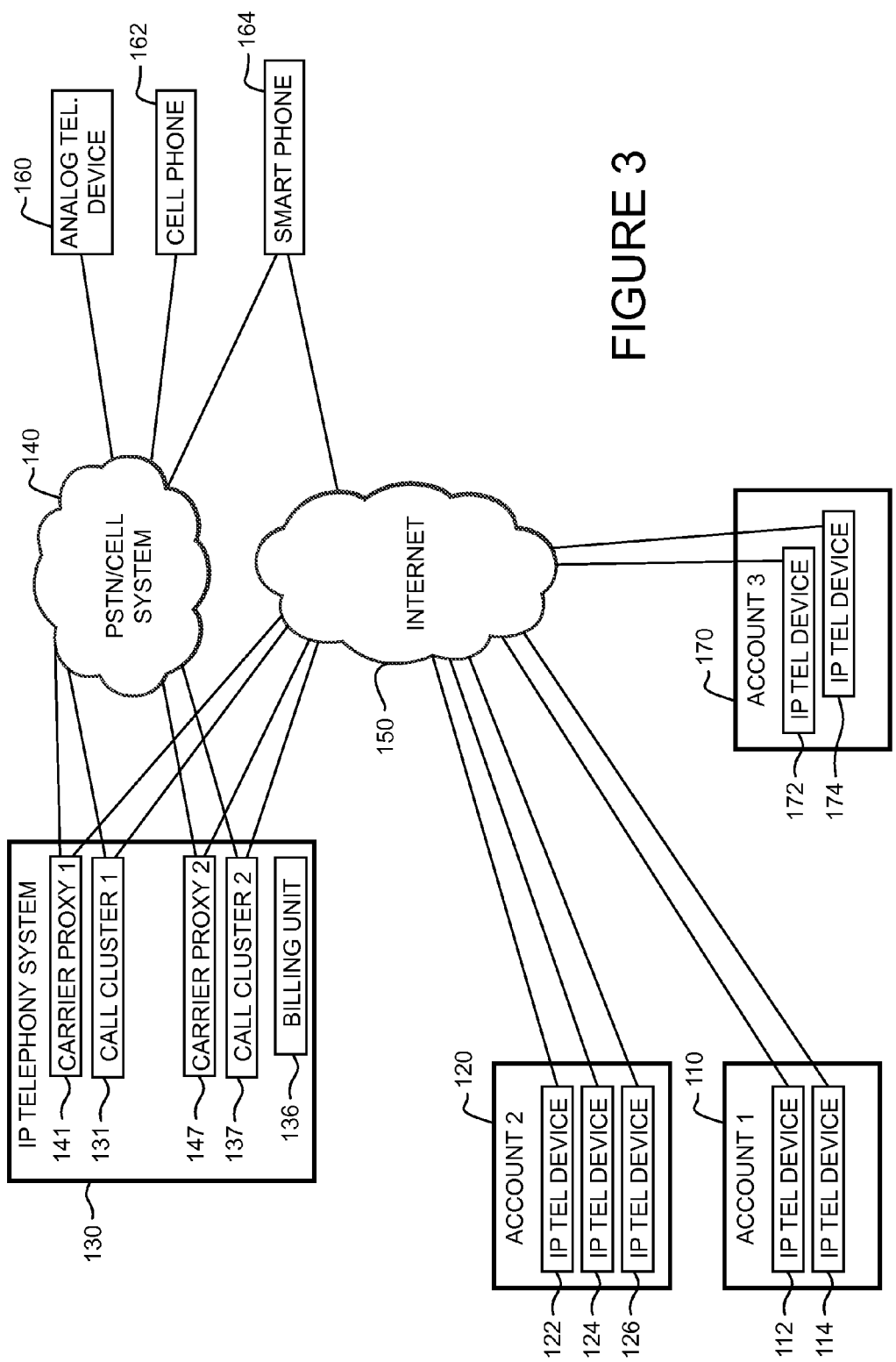
FIG. 3 is a diagram of a communications environment that includes an IP telephony system embodying the invention having two call clusters for routing telephony communications.

FIG. 3 depicts a communications environment which includes an IP telephony system 130 that includes two call clusters. A first call cluster 131 is associated with a first carrier proxy server 141, and a second call cluster 137 is associated with a second carrier proxy server 147. The first call cluster 131 services the IP telephony devices 112, 114, 122, 124, 126 of the first account 110 and the second account 120. The second call cluster 137 services the IP telephony devices 172, 174 of the third account 170. How the carrier proxy servers 141 and 147 act to help route telephony communications for the call clusters will be described in detail below.

Figure 4:
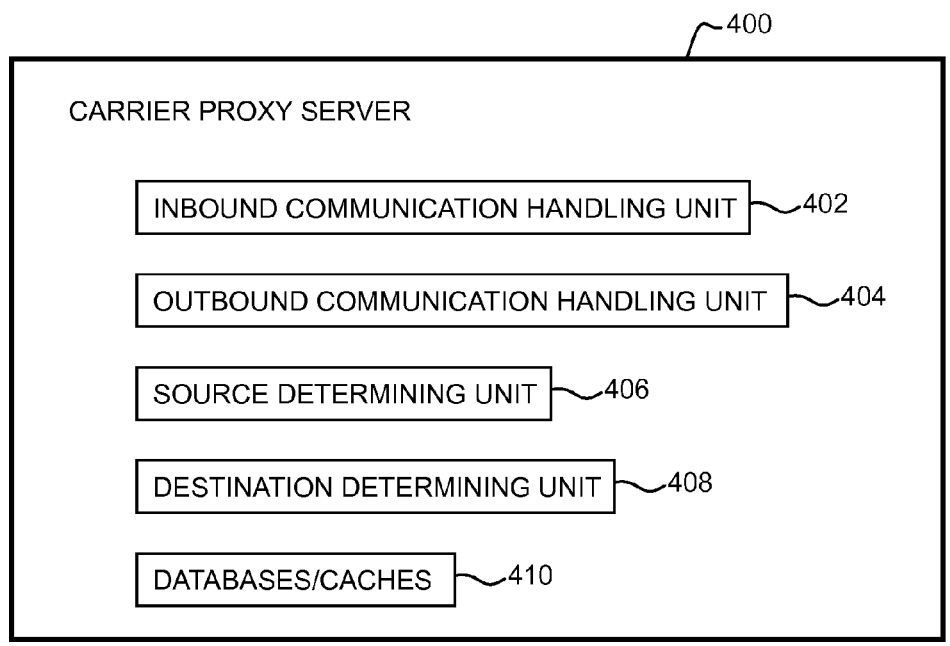
FIG. 4 is a diagram illustrating various elements of a carrier proxy server that is configured to route telephony communications to and from a call cluster of an IP telephony system.

FIG. 4 illustrates elements of a carrier proxy server 400. The carrier proxy server 400 includes an inbound communication handling unit 402 that receives inbound call setup requests from third party telephony systems. An outbound communication handling unit 404 routes call setup requests to third party telephony systems. A source determining unit 406 is configured to determine if a communication setup request originated from a telephony device that is serviced by the IP telephony system 130, or if it originated from a telephony device serviced by a third party telephony system.

A destination determining unit 408 is configured to determine the correct call cluster to which a communication setup request should be routed. The carrier proxy server 400 also includes various databases and caches 410 that help the other elements of the carrier proxy server 400 to perform their various functions. This can include one or more databases that cross-reference telephone numbers of telephony devices to the call clusters that serve those telephony devices.

Figure 5:
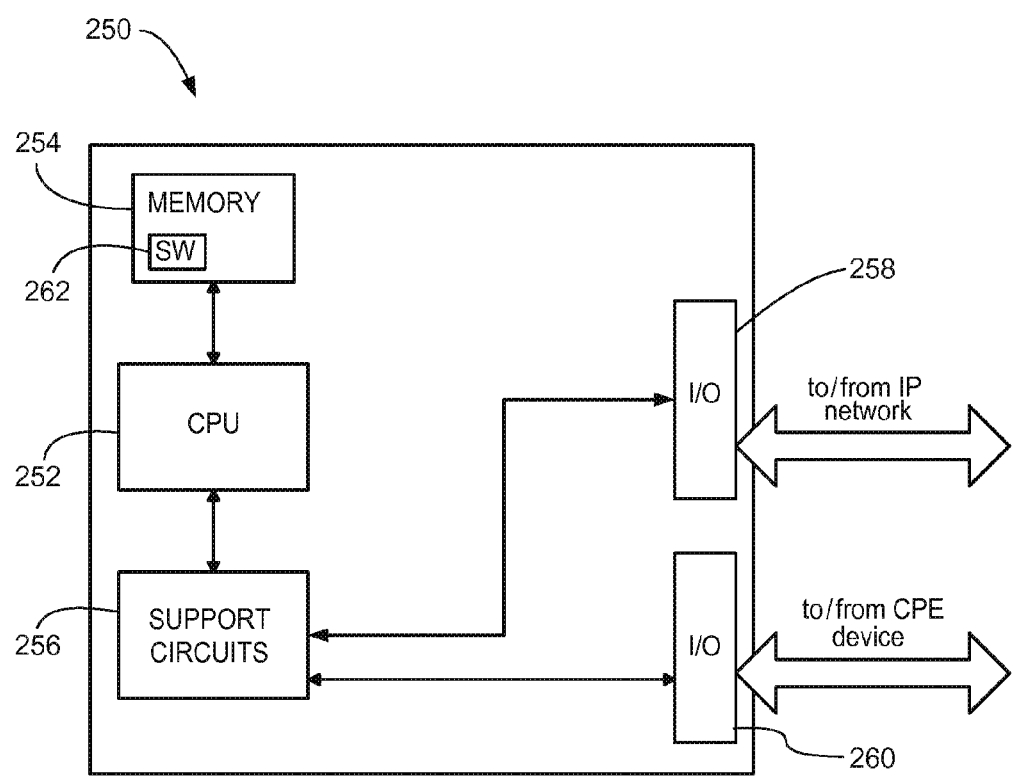
FIG. 5 is a diagram of various elements of a processor that forms part of an IP telephony system, a call cluster, and/or a carrier proxy server.

FIG. 5 illustrates elements of a computer processor 250 that can be used as part of an IP telephony system 130, a call cluster, a carrier proxy server, or a telephony device to accomplish various functions. An IP telephony system 130, a call cluster and/or a carrier proxy server could include multiple processors 250 located at various locations, along with their operating components and programming, each carrying out a specific or dedicated portion of the functions performed by those elements.

The processor 250 shown in FIG. 5 may be one of any form of a general purpose computer processor used in accessing an IP-based network, such as a corporate intranet, the Internet or the like. The processor 250 comprises a central processing unit (CPU) 252, a memory 254, and support circuits 256 for the CPU 252. The processor 250 also includes provisions 258/260 for connecting the processor 250 to customer equipment, to service provider equipment, to and IP network or gateways, as well as possibly one or more input/output devices (not shown) for accessing the processor and/or performing ancillary or administrative functions related thereto. The provisions 258/260 are shown as separate bus structures in FIG. 5; however, they may alternately be a single bus structure without degrading or otherwise changing the intended operability of the processor 250.

The memory 254 is coupled to the CPU 252. The memory 254, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 256 are coupled to the CPU 252 for supporting the processor in a conventional manner. These circuits include cache, power supplies, clock circuits, input/output circuitry and subsystems, and the like.

A software routine 262, when executed by the CPU 252, causes the processor 250 to perform processes of the disclosed embodiments, and is generally stored in the memory 254. The software routine 262 may also be stored and/or executed by a second CPU (not shown) that is remotely located from the hardware being controlled by the CPU 252. Also, the software routines could also be stored remotely from the CPU. For example, the software could be resident on servers and memory devices that are located remotely from the CPU, but which are accessible to the CPU via a data network connection.

The software routine 262, when executed by the CPU 252, transforms the general purpose computer into a specific purpose computer that performs one or more functions of the IP telephony system 120, an application cluster 300 or an IP telephony device. Although the processes of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routine 262 of the disclosed embodiments is capable of being executed on any computer operating system, and is capable of being performed using any CPU architecture.

Figure 6:
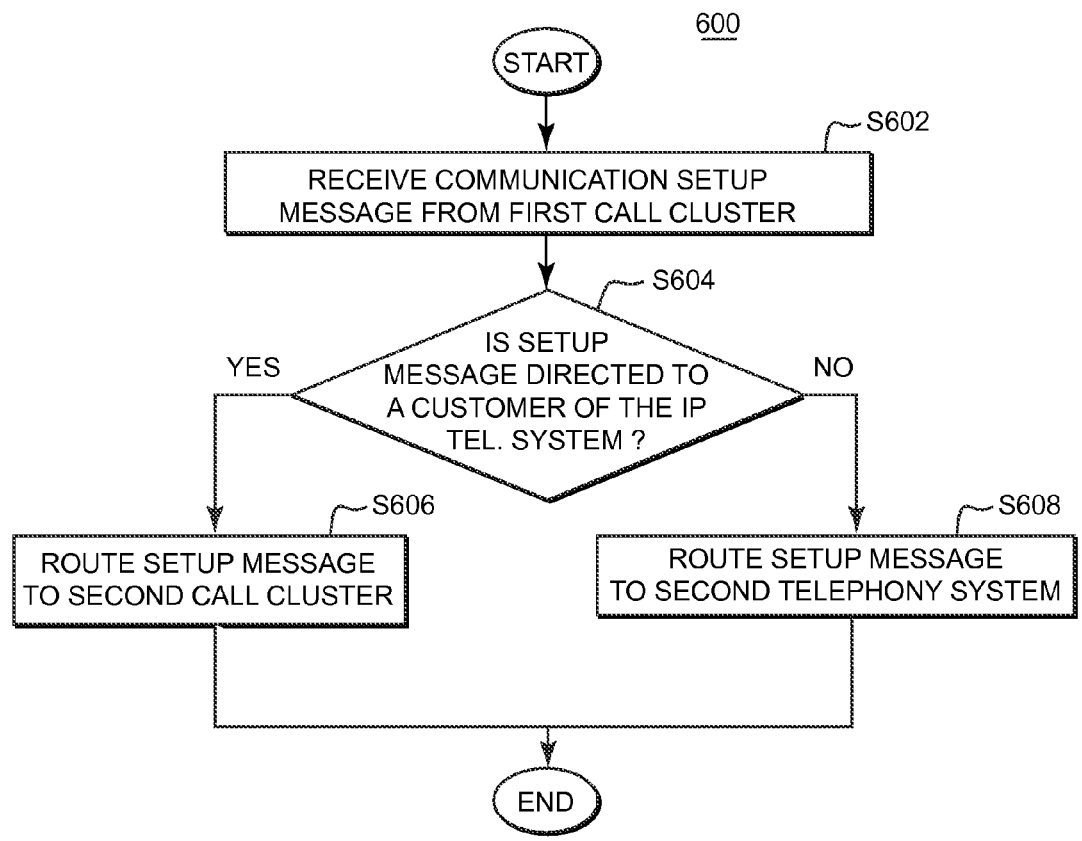
FIG. 6 illustrates steps of a method performed by a carrier proxy server for routing communication setup messaging received from a call cluster.

FIG. 6 illustrates steps of a method that would be performed by a carrier proxy server when it receives a communication setup request from a call cluster. The fact that the call cluster has forwarded the communication setup request to the carrier proxy server means that the communication is directed to a telephony device that is not served by the call cluster. If the communication was directed to another telephony device serviced by the call cluster, elements of the call cluster itself would have routed the communication to the appropriate telephony device. This means that the communication is either directed to a telephony device that is serviced by the IP telephony system, but by a different call cluster of the IP telephony system, or that the communication is directed to a telephony device that is serviced by the third party telephony system.

The method 600 begins and proceeds to step S602 where the carrier proxy server receives a communication setup request from a first call cluster. In step S604, the carrier proxy server determines if the communication is directed to a customer of the IP telephony system. This could be accomplished by consulting a database that lists the telephone numbers of telephony devices serviced by the IP telephony system. If the telephone number of the telephony device to which the communication is directed appears in the database, then the communication is directed to a customer of the IP telephony system. If the telephone number does not appear in the list, then the communication is directed to a telephony device that is not serviced by the IP telephony system.

If the result of step S604 is a determination that the communication setup request is directed to a telephony device that is not serviced by the IP telephony system, the method proceeds to step S608, and the communication setup request is directed to a third party telephony system that is capable of sending the communication setup request to the correct telephony device. If the result of step S604 is a determination that the communication is directed to a telephony device serviced by the IP telephony system, the method proceeds to step S606, and the communication setup request is sent to the call cluster that services the telephony device to which the communication setup request is directed. Performing step S606 may require that the carrier proxy server identity the correct call cluster to which the communication setup request should be sent. This could include consulting a database that cross-references the telephone numbers of telephony devices serviced by the IP telephony system to the call clusters that service those telephony devices. That database could be the same database used in step S604 to determine if the communication setup request is directed to a telephony device serviced by the IP telephony system, or it could be a different database. The method would then end.

The database(s) that are used to accomplish steps S604 and S606 of this method could be a resident in a cache on the carrier proxy server, or the database(s) could be located on a different device entirely. It is advantageous to have the database(s) present in a cache on the carrier proxy server, as this would allow for a very fast determination of the correct information.

The method described above and illustrated in FIG. 6 ensures that communications originating from a telephony device serviced by the IP telephony system and directed to another telephony device serviced by the IP telephony system are handled internally by the IP telephony system. In other words, it is not necessary to involve a third party telephony service provider to route or carry the communication. This is true even when the two telephony devices involved in the communication are serviced by different call clusters.

As mentioned above, when a communication is between two telephony devices that are serviced by the same IP telephony system, and the communication is handled internally by the IP telephony system, the customers may not be charged for the communication. For this to occur, however, the billing system of the IP telephony system must be able to differentiate between communications which are between two IP telephony devices serviced by the IP telephony system, and communications which involve a telephony device that is not serviced by the IP telephony system.

Whenever the various elements of the IP telephony system help to setup or carry a telephony communication, the elements may generate a call detail record (CDR) that is forwarded to a billing unit of the telephony system. The billing unit collects all the CDRs that are generated in connection with a communication, and uses the information in those CDRs to determine who to bill for the communication, and how much to bill for the communication. Because the billing system uses the information in CDRs to determine who and how much to bill, it is advantageous if the CDRs include some information that identifies those communications that were between only two telephony devices serviced by the IP telephony system. This allows the billing system to avoid billing any party for a communication that was between two telephony devices serviced by the IP telephony system.

Figure 7:
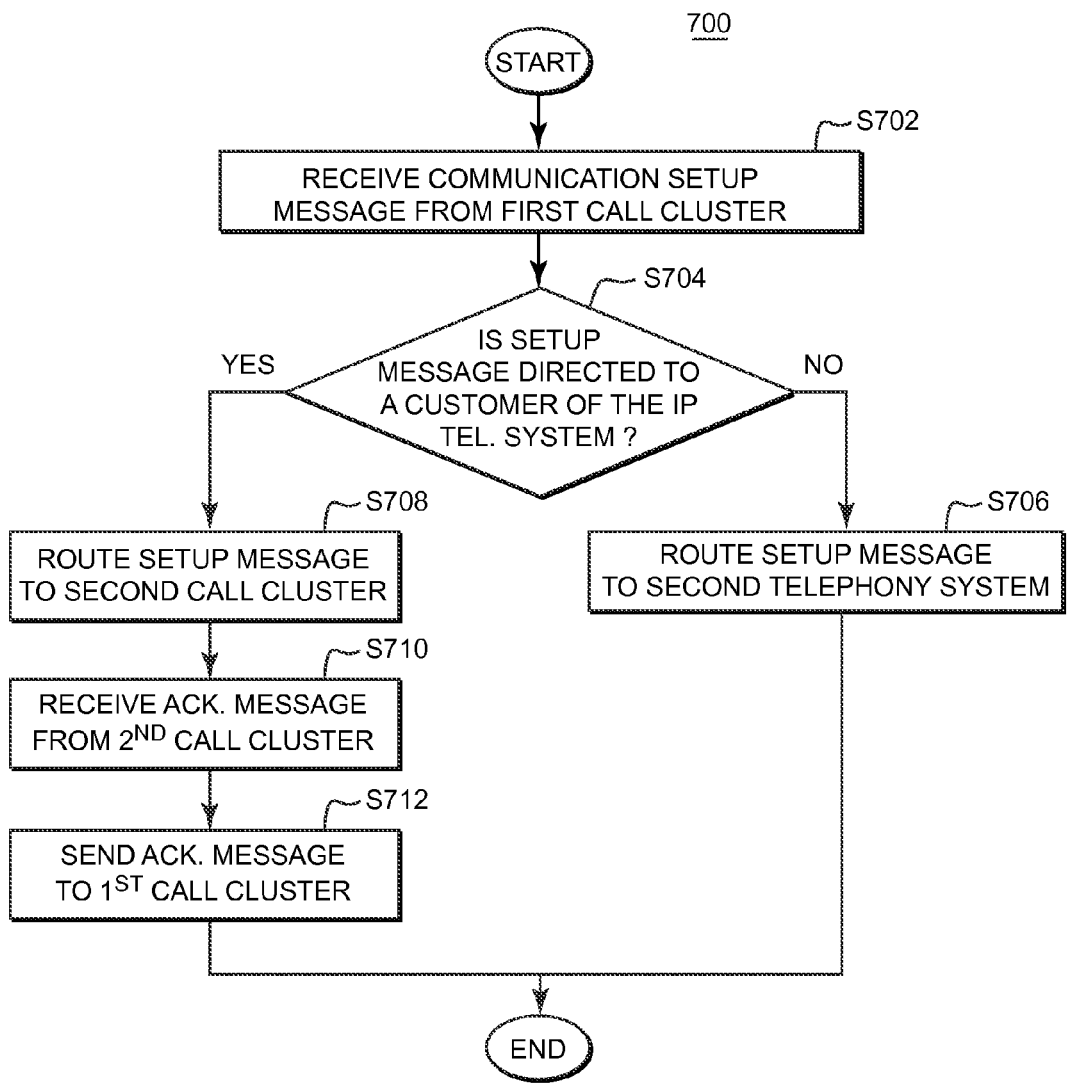
FIG. 7 illustrates steps of another method performed by a carrier proxy server for routing call setup messaging received from a call cluster.

FIG. 7 illustrates a method that is performed by a carrier proxy server to help route a new communications between two telephony devices served by the IP telephony system, and which also results in information being inserted into the CDRs generated by key elements of the system to note that the communication is between two telephony devices served by the IP telephony system. The method 700 begins and proceeds to step S702 where the carrier proxy server receives a communication setup request from a first call cluster. In some embodiments, the received communication setup message will have some key information in a header of the setup message when the setup message arrives at the first call cluster.

In some embodiments, an element of the first call cluster will have inserted into a header of the communication setup message an account identifier for the account of the telephony device that initiated the communication setup message. The element of the first call cluster which inserts this information into the communication setup message could obtain the account identifier from a database which cross-references the telephony devices to the accounts to which they belong, or from some other source. In other instances, the telephony device that generates the communication setup message may insert the account identifier for the account to which it belongs in the header of the communication setup message before the communication setup message is sent to the call cluster. Regardless, in some embodiments, the account identifier for the account of the initiating telephony device will be present in the header of the communication setup message when it arrives at the first call cluster.

In alternate embodiments, the carrier proxy server may insert the account identifier for the account to which the initiating telephony device belongs into the communication setup message when the communication setup message arrives at the carrier proxy server. The account identifier for the account to which the initiating telephony belongs may be obtained from a database which cross-references the telephony devices to their accounts.

In step S704, the carrier proxy server determines if the communication is directed to customer of the IP telephony system. As noted above in connection with the method illustrated in FIG. 6, this could be accomplished by consulting one or more databases If the result of step S704 is a determination that the communication setup request is directed to a telephony device that is not serviced by the IP telephony system, the method proceeds to step S706, and the communication setup message is directed to a third party telephony system that is capable of sending the communication setup request to the correct telephony device.

If the result of step S704 is a determination that the communication setup message is directed to a telephony device serviced by the IP telephony system, the method proceeds to step S708 where the carrier proxy server inserts into a header of the communication setup message an account identifier for the account of the telephony device to which the communication setup request is directed. The account number for the telephony device to which the communication setup message is directed can be obtained from databases that are either locally present in the carrier proxy server, or which are available to the carrier proxy server. The account identifier for the telephony device to which the communication setup message is directed could be inserted into the same header portion of the setup request message that contains the account identifier for the telephony device that initiated the communication setup message, or into another header portion of the setup message. Then, in step S710, the carrier proxy server sends the communication setup request to the call cluster which serves the telephony device to which the communication setup request is directed.

When the second call cluster receives the communication setup request, an element in the second call cluster forwards the communication setup request on to the telephony device to which it is addressed. The telephony device that receives the communication setup request sends an acknowledgment message back to that element of the second call cluster. The element of the second call cluster that receives the acknowledgement message then sends an acknowledgment message back to the carrier proxy server. In step S712 of the method, the carrier proxy server sends an acknowledgment message back to the element of the first call cluster which initially sent the communication setup request to the carrier proxy server. All of these acknowledgment messages will include, in one or more header fields, the account identifier for the initiating telephony device and the account identifier for the telephony device to which the communication setup request was directed. As a result, the element of the first call cluster which forwarded the communication setup request to the carrier proxy server ultimately will be informed of both account identifiers.

Because all elements which participate in routing the communication setup request to the telephony device to which the communication setup request is directed are informed of the account identifiers for both telephony devices, all elements involved in routing the communication setup request can generate CDRs which include the account identifiers for both telephony devices. And including the account identifiers for both telephony devices in the CDRs allows a billing unit of the IP telephony system to later determine that the CDRs relate to a communication which was between two telephony devices serviced by the IP telephony system, and a corresponding rate is applied to the call for billing purposes.

Figure 8:
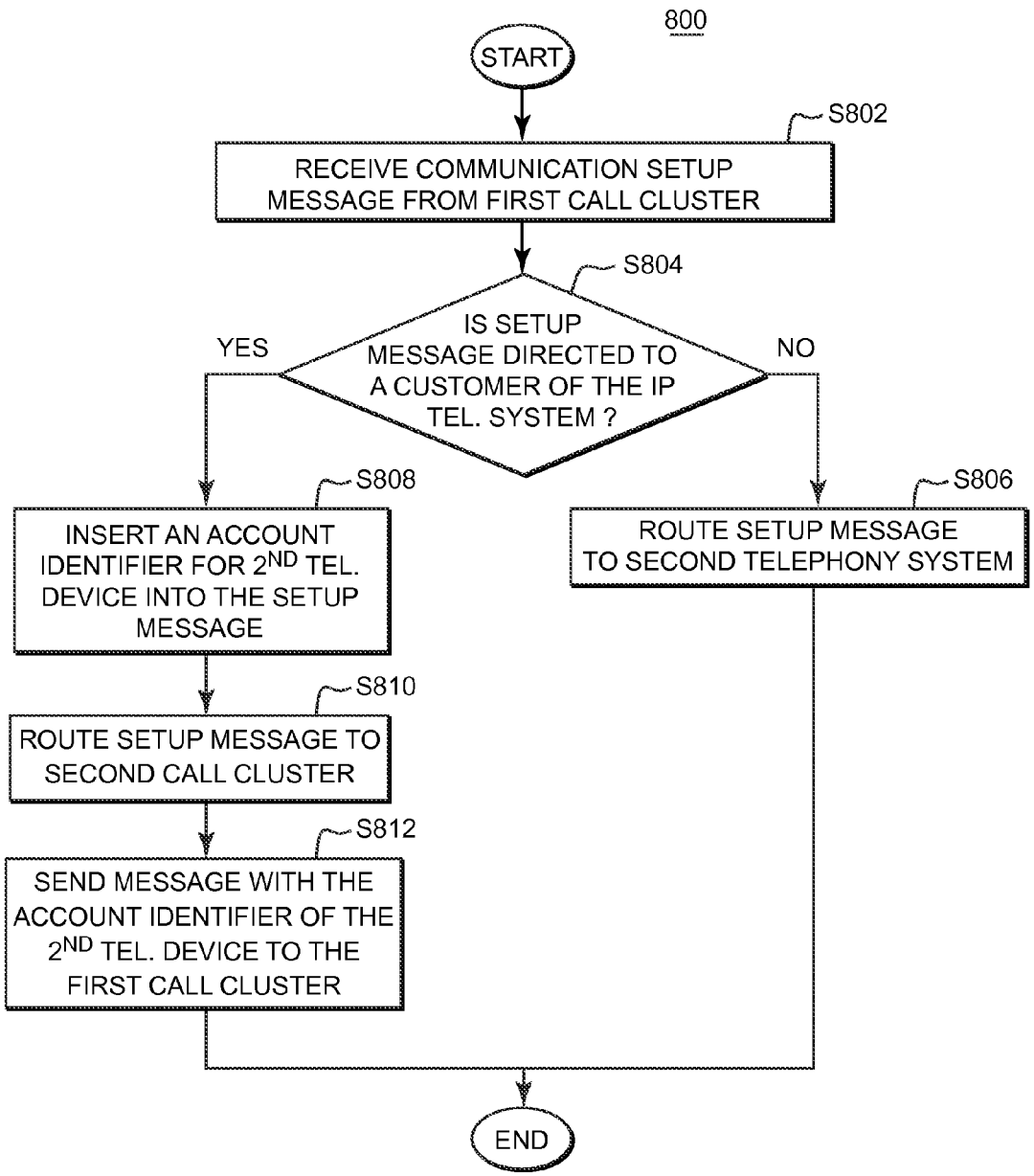
FIG. 8 illustrates steps of another method performed by a carrier proxy server for routing call setup messaging received from a call cluster.

FIG. 8 illustrates steps of an alternate method of routing a communication setup request which also may result in all elements involved in routing the communication setup request being informed of the account identifiers for both the initiating telephony device and the telephony device to which the communication setup request is directed. The method 800 begins and proceeds to step S802 where the carrier proxy server receives a communication setup request from a first call cluster. Here again, the communication setup request may already include an account identifier for the telephony device that initiated the communication setup request. In alternate embodiments, the carrier proxy server may insert the account identifier for the telephony device that initiated the communication setup request into a header of the communication setup request.

In step S804, the carrier proxy server determines if the communication is directed to customer of the IP telephony system. If the result of step S804 is a determination that the communication setup request is directed to a telephony device that is not serviced by the IP telephony system, the method proceeds to step S806, and the communication setup request is directed to a third party telephony system that is capable of sending the communication setup request to the correct telephony device.

If the result of step S804 is a determination that the communication setup request is directed to a telephony device serviced by the IP telephony system, the method proceeds to step S808 where the carrier proxy server inserts into a header of the communication setup request an account identifier for the account of the telephony device to which the communication setup request is directed. The account identifier for the telephony device to which the communication setup request is directed could be inserted into the same header portion of the setup request that contains the account identifier for the telephony device that initiated the communication setup request, or into another header portion of the setup request. Then, in step S810, the carrier proxy server sends the communication setup request to a second call cluster which serves the telephony device to which the communication setup request is addressed.

In step S812, the carrier proxy server sends a message to the element of the first call cluster which forwarded the communication setup request to the carrier proxy server. This message includes the account identifier of the telephony device to which the communication setup request is directed. This ensures that the element of the first call cluster which participated in routing the communication setup request is informed of the account identifier for the telephony device to which the setup request is directed. Thus, the element of the first call cluster that routed the setup request is able to include this information in any CDRs that it generates relating to the communication. The element of the first call cluster could also pass this information on the telephony device that initiated the communication setup request.

In some embodiments, the message that is sent in step S812 from the carrier proxy server to the element of the first call cluster that initially forwarded the communication setup request is an acknowledgment message. In alternate embodiments, the message is a separate message that is merely intended to inform the element of the first call cluster of the account identifier for the telephony device to which the setup request is directed.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method performed by a proxy server of an Internet protocol (IP) telephony system for routing a communication setup message, comprising:
   receiving a communication setup message at the proxy server that is received from a first call cluster of the IP telephony system, the communication setup message having been generated in connection with the setup of a telephony communication requested by a first customer of the IP telephony system, the communication setup message including an account identifier associated with the first customer which identifies an account of the first customer which could be charged for the cost of the requested communication;
   determining if the requested communication is directed to a second customer of the IP telephony system;
   routing the communication setup message to a second call cluster of the IP telephony system when the requested communication is determined to be directed to a second customer of the IP telephony system and inserting an account identifier associated with the second customer into the communication setup message before the communication setup message is routed to the second call cluster, the account identifier associated with the second customer identifying an account which could be charged for the cost of communications conducted by the second customer; and
   routing the communication setup message to a second telephony system when the requested communication is determined not to be directed to a second customer of the IP telephony system.

2. The method of claim 1, wherein determining if the requested communication is directed to a second customer of the IP telephony system comprises determining if a destination identifier in the setup message is included in a list of identifiers associated with customers of the IP telephony system.

3. The method of claim 2, wherein determining if a destination identifier in the setup message is included in a list of identifiers associated with customers of the IP telephony system comprises performing a lookup in a local cache of the proxy server.

4. The method of claim 2, wherein determining if a destination identifier in the setup message is included in a list of identifiers associated with customers of the IP telephony system comprises determining if a destination telephone number in the setup message is included in a list of telephone numbers associated with customers of the IP telephony system.

5. The method of claim 1, wherein the account identifier associated with the first customer is contained within a header of the setup message.

6. The method of claim 1, wherein the account identifier associated with the second customer is inserted into a header of the setup message.

7. The method of claim 1, wherein the account identifier associated with the first customer is present in a portion of a header of the setup message, and wherein the account identifier associated with the second customer is inserted into the same portion of the header of the setup message that contains the account identifier associated with the first customer.

8. The method of claim 1, further comprising sending an acknowledgement message to the first call cluster, wherein the acknowledgment message includes the account identifier associated with the first customer and the account identifier associated with the second customer.

9. The method of claim 8, wherein the account identifier associated with the first customer and the account identifier associated with the second customer are in the same portion of a header of the acknowledgment message.

10. The method of claim 1, further comprising:
receiving an acknowledgment message from the second call cluster of the IP telephony system, the acknowledgment message including the account identifier associated with the second customer; and
sending an acknowledgement message to the first call cluster, wherein the acknowledgment message includes the account identifier associated with the first customer and the account identifier associated with the second customer.

11. The method of claim 10, wherein the account identifier associated with the first customer and the account identifier associated with the second customer are stored in a header field of the acknowledgment message sent to the first call cluster.

12. A non-transitory computer readable medium having instructions stored thereon which, when performed by one or more processors of a computer server, cause the computer server to perform a method of routing a communication setup message, the method comprising:
receiving a communication setup message at the computer server that is received from a first call cluster of an IP telephony system, the communication setup message having been generated in connection with the setup of a telephony communication requested by a first customer of the IP telephony system, the communication setup message including an account identifier associated with the first customer which identifies an account of the first customer which could be charged for the cost of the requested communication;
determining if the requested communication is directed to a second customer of the IP telephony system;
routing the communication setup message to a second call cluster of the IP telephony system when the requested communication is determined to be directed to a second customer of the IP telephony system and inserting an account identifier associated with the second customer into the communication setup message before the communication setup message is routed to the second call cluster, the account identifier associated with the second customer identifying an account which could be charged for the cost of communications conducted by the second customer; and
routing the communication setup message to a second telephony system when the requested communication is determined not to be directed to a second customer of the IP telephony system.

13. The non-transitory computer readable medium of claim 12, wherein determining if the requested communication is directed to a second customer of the IP telephony system comprises determining if a destination identifier in the setup message is included in a list of identifiers associated with customers of the IP telephony system.

14. The non-transitory computer readable medium claim 13, wherein determining if a destination identifier in the setup message is included in a list of identifiers associated with customers of the IP telephony system comprises performing a lookup in a local cache of the computer server.

15. The non-transitory computer readable medium of claim 13, wherein determining if a destination identifier in the setup message is included in a list of identifiers associated with customers of the IP telephony system comprises determining if a destination telephone number in the setup message is included in a list of telephone numbers associated with customers of the IP telephony system.

16. The non-transitory computer readable medium of claim 12, wherein the account identifier associated with the first customer is contained within a header of the setup message.

17. The non-transitory computer readable medium of claim 12, wherein the account identifier associated with the second customer is inserted into a header of the setup message.

18. The non-transitory computer readable medium of claim 12, wherein the account identifier associated with the first customer is present in a portion of a header of the setup message, and wherein the account identifier associated with the second customer is inserted into the same portion of the header of the setup message that contains the account identifier associated with the first customer.

19. The non-transitory computer readable medium of claim 12, further comprising sending an acknowledgement message to the first call cluster, wherein the acknowledgment message includes the account identifier associated with the first customer and the account identifier associated with the second customer.

20. The non-transitory computer readable medium of claim 19, wherein the account identifier associated with the first customer and the account identifier associated with the second customer are in the same portion of a header of the acknowledgment message.

21. The non-transitory computer readable medium of claim 12, wherein the method further comprises:
receiving an acknowledgment message from the second call cluster of the IP telephony system, the acknowledgment message including the account identifier associated with the second customer; and
sending an acknowledgement message to the first call cluster, wherein the acknowledgment message includes the account identifier associated with the first customer and the account identifier associated with the second customer.

22. The non-transitory computer readable medium of claim 21, wherein the account identifier associated with the first customer and the account identifier associated with the second customer are stored in a header field of the acknowledgment message sent to the first call cluster.

23. A method performed by a proxy server of an Internet protocol (IP) telephony system for routing a communication setup message, comprising:
receiving a communication setup message at the proxy server that is received from a first call cluster of the IP telephony system, the communication setup message having been generated in connection with the setup of a telephony communication requested by a first customer of the IP telephony system, the communication setup message including an account identifier associated with the first customer which identifies an account of the first customer which could be charged for the cost of the request communication;

determining if the requested communication is directed to a second customer of the IP telephony system;

routing the communication setup message to a second call cluster of the IP telephony system when the requested communication is determined to be directed to a second customer of the IP telephony system;

sending an acknowledgement message to the first call cluster when the requested communication is determined to be directed to a second customer of the IP telephony system, wherein the acknowledgment message includes the account identifier associated with the first customer and an account identifier associated with the second customer which identifies an account of the second customer which could be charged for the cost of communications conducted by the second customer; and routing the communication setup message to a second telephony system when the requested communication is determined not to be directed to a second customer of the IP telephony system.

24. The method of claim 23, wherein the account identifier associated with the first customer and the account identifier associated with the second customer are in the same portion of a header of the acknowledgment message.

25. The method of claim 23, further comprising receiving an acknowledgment message from the second call cluster of the IP telephony system, the acknowledgment message including the account identifier associated with the second customer.

26. A non-transitory computer readable medium having instructions stored thereon which, when performed by one or more processors of a computer server, cause the computer server to perform a method of routing a communication setup message, the method comprising:

receiving a communication setup message at the computer server that is received from a first call cluster of an IP telephony system, the communication setup message having been generated in connection with the setup of a telephony communication requested by a first customer of the IP telephony system the communication setup message including an account identifier associated with the first customer which identifies an account of the first customer which could be charged for the cost of the requested communication;

determining if the requested communication is directed to a second customer of the IP telephony system;

routing the communication setup message to a second call cluster of the IP telephony system when the requested communication is determined to be directed to a second customer of the IP telephony system;

sending an acknowledgement message to the first call cluster when the requested communication is determined to be directed to a second customer of the IP telephony system, wherein the acknowledgment message includes the account identifier associated with the first customer and an account identifier associated with the second customer which identifies an account of the second customer which could be charged for the cost of communications conducted by the second customer; and routing the communication setup message to a second telephony system when the requested communication is determined not to be directed to a second customer of the IP telephony system.

27. The method of claim 26, wherein the account identifier associated with the first customer and the account identifier associated with the second customer are in the same portion of a header of the acknowledgment message.

28. The method of claim 26, further comprising receiving an acknowledgment message from the second call cluster of the IP telephony system, the acknowledgment message including the account identifier associated with the second customer.

* * * * *